(12) United States Patent
Chen et al.

(10) Patent No.: US 7,231,090 B2
(45) Date of Patent: Jun. 12, 2007

(54) METHOD FOR PERFORMING MOTION ESTIMATION WITH WALSH-HADAMARD TRANSFORM (WHT)

(75) Inventors: Hongyi Chen, Beijing (CN); Xiaohai Qiu, Shanghai (CN)

(73) Assignee: Winbond Electronics Corp., Hsinchu (TW)

( * ) Notice: Subject to any disclaimer, the term of this patent is extended or adjusted under 35 U.S.C. 154(b) by 601 days.

(21) Appl. No.: 10/283,477

(22) Filed: Oct. 29, 2002

(65) Prior Publication Data

US 2004/0081361 A1    Apr. 29, 2004

(51) Int. Cl.
G06K 9/36 (2006.01)
G06K 9/46 (2006.01)
(52) U.S. Cl. .................. 382/236; 382/238; 382/248
(58) Field of Classification Search ................ 382/236
See application file for complete search history.

(56) References Cited

U.S. PATENT DOCUMENTS

| | | | | |
|---|---|---|---|---|
| 5,097,331 A | * | 3/1992 | Chen et al. | ............ 375/240.11 |
| 5,815,602 A | * | 9/1998 | Ueda et al. | ................ 382/236 |
| 6,040,864 A | * | 3/2000 | Etoh | .................... 375/240.16 |
| 6,380,986 B1 | * | 4/2002 | Minami et al. | ........... 348/699 |
| 6,687,296 B1 | * | 2/2004 | Sato et al. | ............ 375/240.12 |
| 6,693,954 B1 | * | 2/2004 | King et al. | ................. 375/147 |
| 6,950,469 B2 | * | 9/2005 | Karczewicz et al. | ... 375/240.17 |

OTHER PUBLICATIONS

Sundarajan, D.; Ahmad, M.O.; Fast computation of the discrete Walsh and Hadamard transformsmage; Processing, IEEE Transactions on; vol. 7, Issue 6, Jun. 1998 pp. 898-904.*

Fast computation of the discrete Walsh and Hadamard transforms, Sundararajan, D.; Ahmad, M.O.; Image Processing, IEEE Transactions on, vol. 7, Issue 6, Jun. 1998 pp. 898-904.*

* cited by examiner

Primary Examiner—Wenpeng Chen
Assistant Examiner—Yuzhen Ge
(74) Attorney, Agent, or Firm—J.C. Patents

(57) ABSTRACT

A method for performing a motion estimation combined with a Walsh-Hadamard transform algorithm. In image frame, which includes a pixel array to display an image object, the method includes fetching a current image pixel content C and a reference image pixel content R. A Walsh-Hadamard transform algorithm is used to transform the current image pixel content C and the reference image pixel content R, so that a WHT SAD(i, j), WSAD(i,j) is computed to serve as a matching criterion. The formula for computing WSAD(i,j) is $$WSAD(i, j) = \sum_{k=0}^{N-1}\sum_{l=0}^{N-1} |W_E(k, l)| = \sum_{k=0}^{N-1}\sum_{l=0}^{N-1} |W_C(k, l) - W_{R(i,j)}(k, l)|,$$

$$W_E(k,l) = WHT(E) = WHT(C-R(i,j)) = W_C - W_{R(i,j)},$$

$$W_C = WHT(C) = \sum_{\mu=0}^{N-1}\sum_{v=0}^{N-1} t_{k,l}(\mu, v) \times C(x+\mu, y+v),$$

$$W_{R(i,j)} = WHT(R(i, j)) = \sum_{\mu=0}^{N-1}\sum_{v=0}^{N-1} t_{k,l}(\mu, v)R(x+i+\mu, y+j+v),$$

where E is the difference macro block (MB) of a current MB and a reference MB, (x, y) is the location of current MB, (i,j) is the candidate motion vector, i.e., the location of reference MB, N is the MB size, and $t_{i,j} = t_i \cdot t_j'$, where $t_{i,j}$ is a matrix by a product of two basis $t_i$ and $Trans[t_j]$.

13 Claims, 9 Drawing Sheets

METHOD FOR PERFORMING MOTION ESTIMATION WITH WALSH-HADAMARD TRANSFORM (WHT)

BACKGROUND OF THE INVENTION

1. Field of Invention

The present invention relates to image processing. More particularly, the present invention relates to a method for performing a motion estimation combined with a Walsh-Hadamard transform (WHT), so as to at least reduce the computation load and increase the operation speed.

2. Description of Related Art

As the fabrication technology have been greatly improved, the displaying device now has allowed a displaying manner in digital format, such as the liquid crystal display (LCD) panel or HDTV. The image is composed of a large number of image pixels. Each of the image pixels can be separately controlled. However, the image usually is displayed in motion, then the image processing is necessary to transform each of the pixels.

Motion estimation (ME) and discrete cosine transformation (DCT)-coding have been developed and adopted to eliminate the temporal redundancy in image sequences by most video encoding algorithms, such as MPEG 1, MPEG 2, H.261, H.263, and so on. In this motion estimation algorithm, the sum of absolute difference (SAD) of the luminance pixels has been widely used as matching criterion in ME. It generates a different block with minimum energy, but there might be large special redundancies and it requires more encoding bit-amounts.

The algorithm for the conventional motion estimation is shown in FIG. 1. In FIG. 1, the image frame 100 within, for example, a 3 by 3 block with 9 elements is shown. The image object 102a is moved to the image object 102b. For example, the central element all has been shifted to a lower-right new location. Then, these two elements with respect to the concerning element all are taken out and subtracted to each other by the subtractor 104. And then, the parameters for the motion vector (MV) are determined. The quantity of the sum of absolute difference (SAD) of luminance pixels is used as the matching criterion, where $$SAD(i, j) = \sum_{k=0}^{N-1}\sum_{l=0}^{N-1} |E(k,l)| = \sum_{k=0}^{N-1}\sum_{l=0}^{N-1} |C(x+k, y+l) - R(x+i+k, y+j+l)|, \quad (1)$$

where C is the current image, R is the reference image, and E is the difference macro block (MB) of the current MB and reference MB, (x, y) is the location of current MB, (i,j) is the candidate motion vector, i.e., the location of reference MB, and N is the MB size.

As the technologies of ME and DCT-coding have been adopted to eliminate the temporal and special redundancies in image sequence by most of video compression algorithms, the ME plays a key role for computation complexity, compression efficiency and image quality. Due to the heavy operation load of full search (FS), lots of fast algorithms are developed for real time video coding. Generally, along with reduction of computation complex of ME, the image quality gets poor.

There are several factors which affect image quality. One of the factors is the matching between conventional ME and DCT coding. For example, SAD of luminance pixels has been used as the criterion in ME, due to simplicity and regularity. It generates luminance difference block with globe or local minimum energy, i.e., minimum DC coefficient after DCT, but the DC coefficients might be large and requires bigger encoding bit-amount. In other words, the property of DCT is not taken into account during conventional ME procedure. There might be great special redundancies in the resulted difference block. This causes a poor efficiency of DCT coding.

In the conventional motion estimation, the operation speed, due to much redundant computation in data transformation, is still not sufficiently fast. It should still have some way to improve the operation speed in motion estimation.

SUMMARY OF THE INVENTION

The invention provides a method for performing a motion estimation combined with a Walsh-Hadamard transform algorithm. The present invention can then result in low spatial redundancy difference block and high encoding efficiency, wherein the subsampling algorithm is employed to reduce the operation load while maintaining the high image quality.

As embodied and broadly described herein, the invention provides a method for performing a motion estimation combined with a Walsh-Hadamard transform algorithm. In the image frame, which includes a pixel array to display an image object, the method includes fetching a current image pixel content C and a reference image pixel content R. A Walsh-Hadamard transform algorithm is used to transform the current image pixel content C and the reference image pixel content R, so that a WHT SAD(i, j), WSAD(i,j) is computed to serve as a matching criterion. The formula for computing a matching criterion of WSAD(i,j) is $$WSAD(i, j) = \sum_{k=0}^{N-1}\sum_{l=0}^{N-1} |W_E(k,l)| = \sum_{k=0}^{N-1}\sum_{l=0}^{N-1} |W_C(k,l) - W_{R(i,j)}(k,l)|,$$

$$W_E(k,l) = WHT(E) = WHT(C - R(i,j)) = W_C - W_{R(i,j)},$$

$$W_C = WHT(C) = \sum_{\mu=0}^{N-1}\sum_{v=0}^{N-1} t_{k,l}(\mu, v) \times C(x+\mu, y+v),$$

$$W_{R(i,j)} = WHT(R(i,j)) = \sum_{\mu=0}^{N-1}\sum_{v=0}^{N-1} t_{k,l}(\mu, v) R(x+i+\mu, y+j+v),$$

where E is the difference macro block (MB) of a current MB and a reference MB, (x, y) is the location of current MB, (i,j) is the candidate motion vector, i.e., the location of reference MB, N is the MB size, and $t_{kl}=t_k \cdot t'_l$, where $t_{kl}$ is a matrix by a product of two basis $t_k$ and $Trans[t_l]$, wherein when N is equal to 8, then the bases $t_k$ and $t_l$ are selected from eight bases of:

$$t_0 = \begin{bmatrix} 1 \\ 1 \\ 1 \\ 1 \\ 1 \\ 1 \\ 1 \\ 1 \end{bmatrix}, t_1 = \begin{bmatrix} 1 \\ 1 \\ 1 \\ 1 \\ -1 \\ -1 \\ -1 \\ -1 \end{bmatrix}, t_2 = \begin{bmatrix} 1 \\ 1 \\ -1 \\ -1 \\ -1 \\ -1 \\ 1 \\ 1 \end{bmatrix}, t_3 = \begin{bmatrix} 1 \\ 1 \\ -1 \\ -1 \\ 1 \\ 1 \\ -1 \\ -1 \end{bmatrix},$$

$$t_4 = \begin{bmatrix} 1 \\ -1 \\ -1 \\ 1 \\ 1 \\ -1 \\ -1 \\ 1 \end{bmatrix}, t_5 = \begin{bmatrix} 1 \\ -1 \\ -1 \\ 1 \\ -1 \\ 1 \\ 1 \\ -1 \end{bmatrix}, t_6 = \begin{bmatrix} 1 \\ -1 \\ 1 \\ -1 \\ -1 \\ 1 \\ -1 \\ 1 \end{bmatrix}, t_7 = \begin{bmatrix} 1 \\ -1 \\ 1 \\ -1 \\ 1 \\ -1 \\ 1 \\ -1 \end{bmatrix}.$$

In the forgoing method for performing the motion estimation, when a size of N*N MB is used for the motion estimation, and four (N/2)*(N/2) blocks are used in discrete cosine transform (DCT) computation, the matching criterion WASD(i,j) is computed by $$WSAD(i, j) = WSAD_{1,1}(i, j) + WSAD_{1,2}(i, j) + WSAD_{2,1}(i, j) + WSAD_{2,2}(i, j),$$

$$WSAD_{mn}(i, j) = \sum_{k=0}^{N-1} \sum_{l=0}^{N-1} |W_{Cmn}(k, l) - W_{Rmn(i,j)}(k, l)|, m, n = 1, 2$$

$$W_{C11}(k, l) = \sum_{\mu=0}^{N/2-1} \sum_{v=0}^{N/2-1} t_{k,l}(\mu, v) C(x+\mu, y+v),$$

$$W_{C12}(k, l) = \sum_{\mu=0}^{N/2-1} \sum_{v=N/2}^{N-1} t_{k,l}(\mu, v) C(x+\mu, y+v),$$

$$W_{C21}(k, l) = \sum_{\mu=N/2}^{N-1} \sum_{v=0}^{N/2-1} t_{k,l}(\mu, v) C(x+\mu, y+v), \text{ and}$$

$$W_{C22}(k, l) = \sum_{\mu=N/2}^{N-1} \sum_{v=N/2}^{N-1} t_{k,l}(\mu, v) C(x+\mu, y+v),$$

where N can be, for example, 8, 16, 32, and so on. The $W_{C11}(k,l)$, $W_{C12}(k,l)$, $W_{C21}(k,l)$, and $W_{C22}(k,l)$ are transformed coefficients of four (N/2)*(N/2) blocks of current MB, and the formula of $W_{R(i,j)11}$, $W_{R(i,j)12}$, $W_{R(i,j)21}$, and $W_{R(i,j)22}$ are similar to those of $W_{C11}(k,l)$, $W_{C12}(k,l)$, $W_{C21}(k,l)$, and $W_{C22}(k,l)$, wherein $t_{kl}=t_k \cdot t'_l$, where $t_{kl}$ is a matrix by a product of two basis $t_k$ and $\text{Trans}[t_l]$, wherein when N is equal to 16, then the bases $t_k$ and $t_l$ are selected from eight bases of:

$$t_0 = \begin{bmatrix} 1 \\ 1 \\ 1 \\ 1 \\ 1 \\ 1 \\ 1 \\ 1 \end{bmatrix}, t_1 = \begin{bmatrix} 1 \\ 1 \\ 1 \\ 1 \\ -1 \\ -1 \\ -1 \\ -1 \end{bmatrix}, t_2 = \begin{bmatrix} 1 \\ 1 \\ -1 \\ -1 \\ -1 \\ -1 \\ 1 \\ 1 \end{bmatrix}, t_3 = \begin{bmatrix} 1 \\ 1 \\ -1 \\ -1 \\ 1 \\ 1 \\ -1 \\ -1 \end{bmatrix},$$

$$t_4 = \begin{bmatrix} 1 \\ -1 \\ -1 \\ 1 \\ 1 \\ -1 \\ -1 \\ 1 \end{bmatrix}, t_5 = \begin{bmatrix} 1 \\ -1 \\ -1 \\ 1 \\ -1 \\ 1 \\ 1 \\ -1 \end{bmatrix}, t_6 = \begin{bmatrix} 1 \\ -1 \\ 1 \\ -1 \\ -1 \\ 1 \\ -1 \\ 1 \end{bmatrix}, t_7 = \begin{bmatrix} 1 \\ -1 \\ 1 \\ -1 \\ 1 \\ -1 \\ 1 \\ -1 \end{bmatrix}.$$

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

The present invention is directed to the technology in motion estimation for the video signal processing. The motion estimation usually has a heavy computation load. In order to reduce the computation load and increase the operation efficiency, the present invention combines the Walsh-Hadamard transform (WHT) algorithm and results in low spatial redundancy difference block and high encoding efficiency. Also and, the subsampling algorithm is employed to reduce the operation load while maintaining the high image quality.

Figure 1:
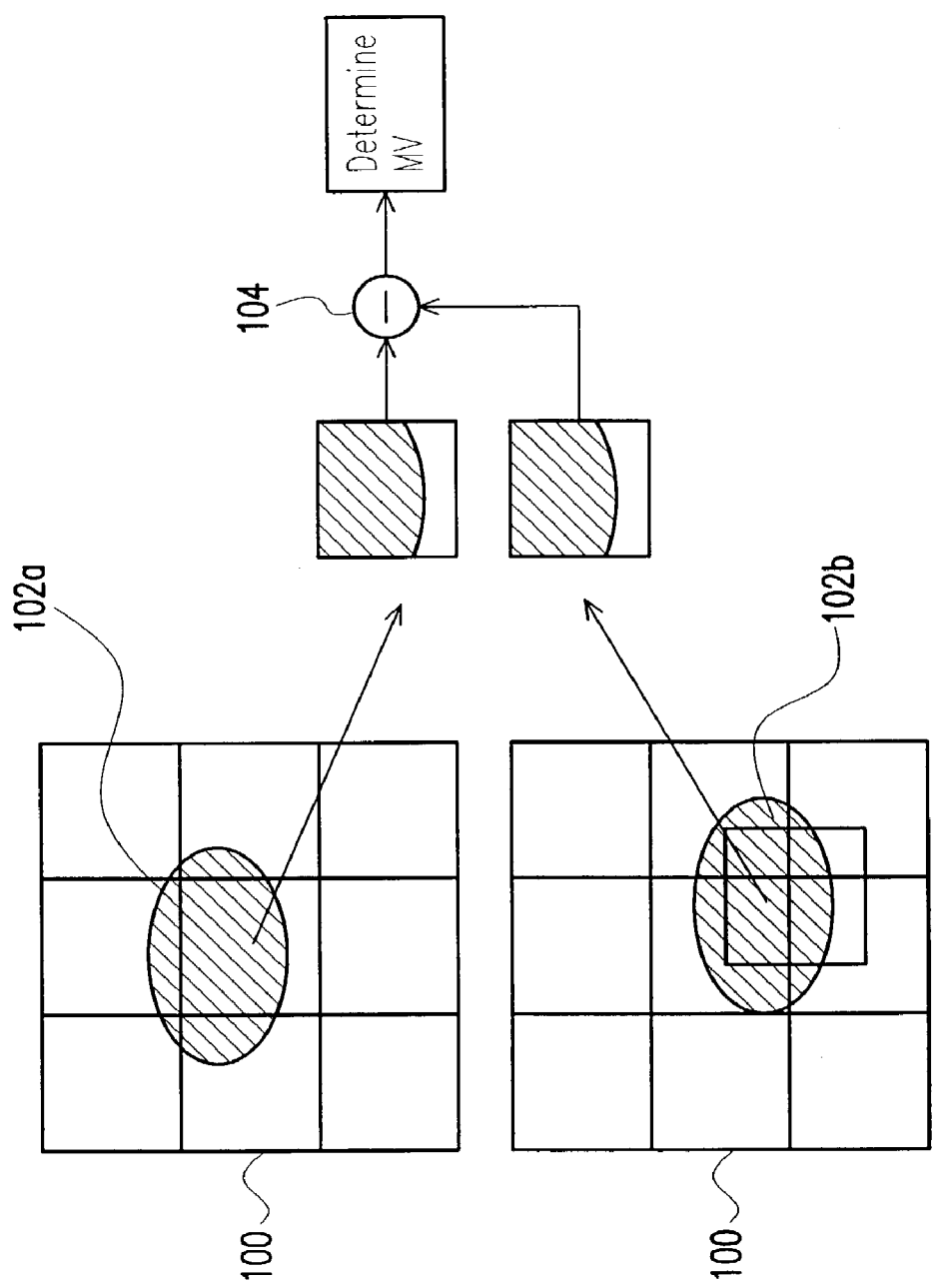
FIG. 1 is a drawing, schematically illustrating the conventional ME algorithm.
Figure 2:
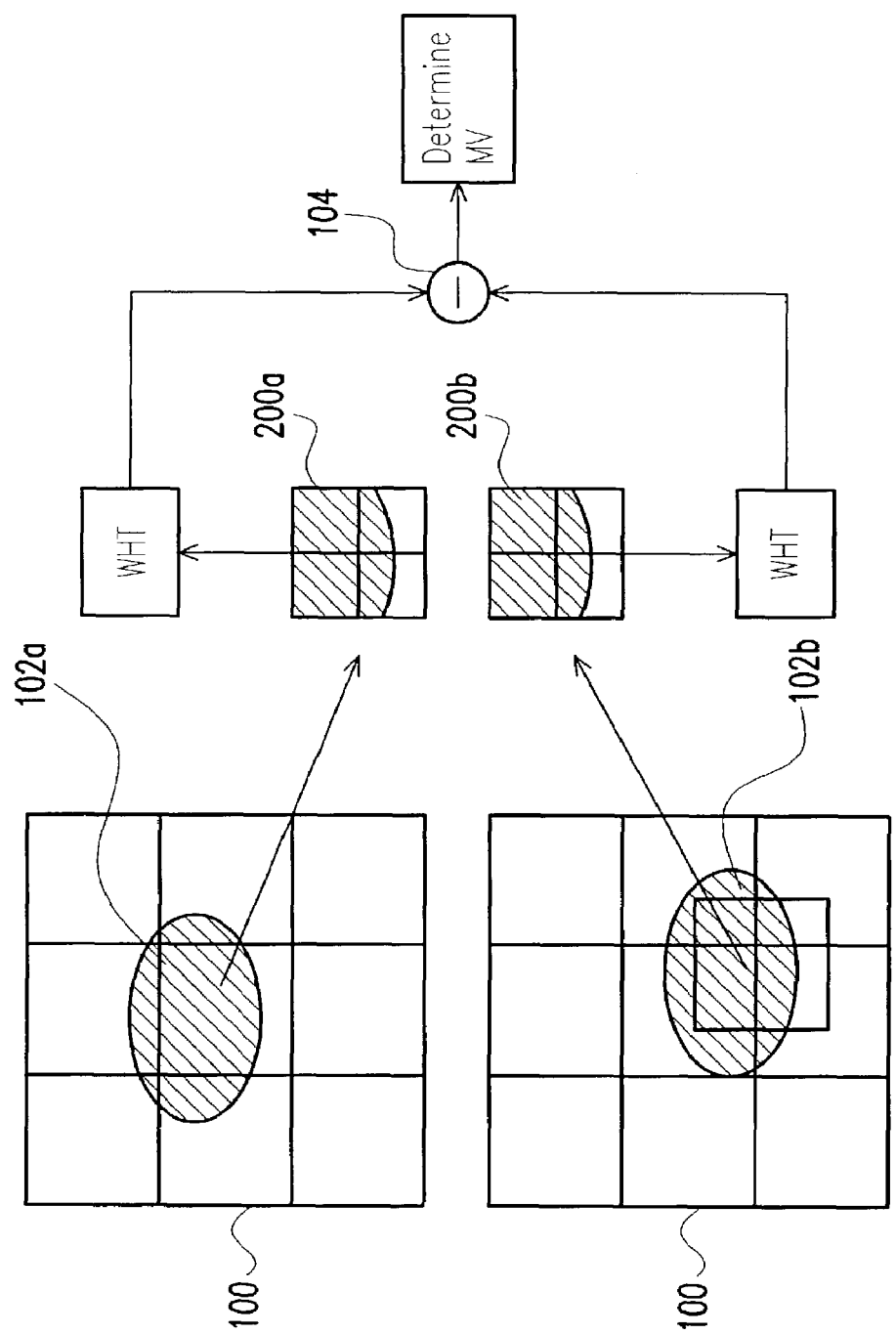
FIG. 2 is a drawing, schematically illustrating the WHT_ME algorithm, according to one preferred embodiment of this invention.
Figure 3:
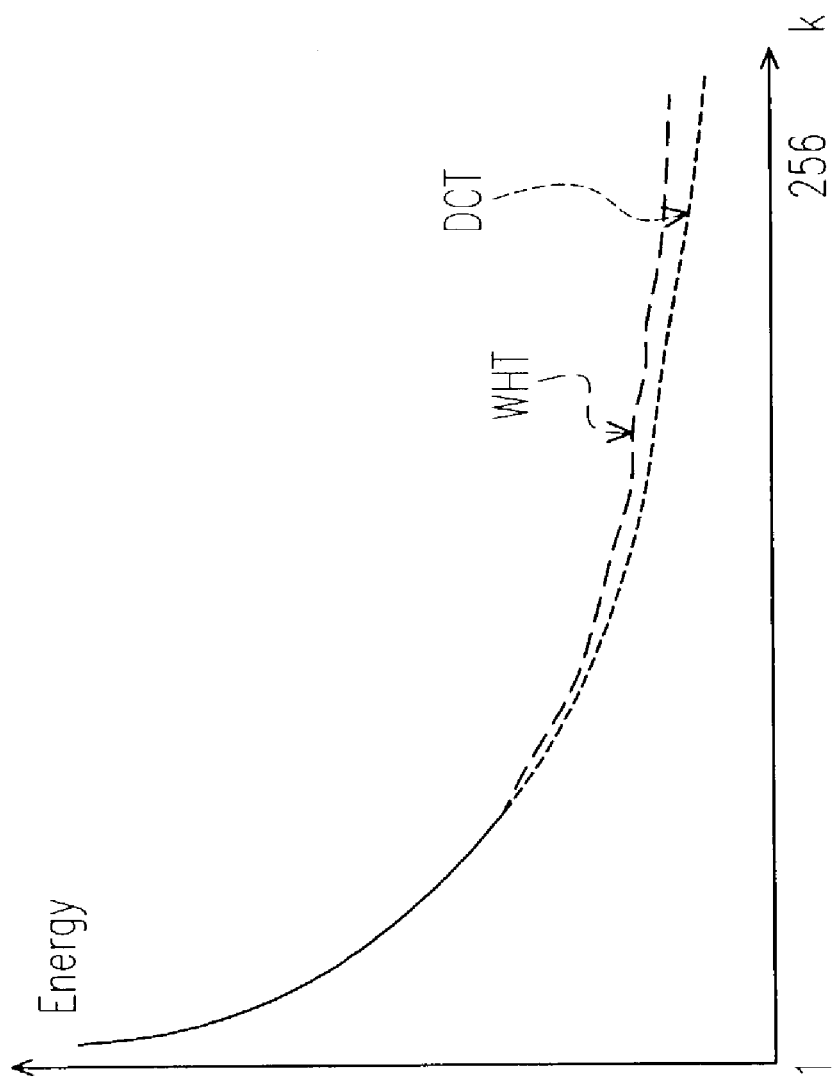
FIG. 3 is a drawing schematically illustrating a comparison for energy packing with respect to 1-D WHT and DCT

The conventional motion estimation (ME) algorithm has been shown in FIG. 1. The invention modifies the conventional ME into a WHT_ME algorithm, which is the ME algorithm with a WHT algorithm. The basic WHT_ME algorithm is shown in FIG. 2. The image object 102a at the current position in the frame is moved to the image object 102b. However, the image object 102a is divided into four blocks 200a and is transformed by the WHY algorithm 202a. Similarly, the image object 102b serving as a reference is also divided into four blocks 202b and processed according to the WHT algorithm 202b. After the WHT transformation, the two results are subtracted to obtain the WHT SAD (WSAD) for each position (i,j), so as to determine the motion vector (MV).

WHT is the simplest orthogonal transform and illuminates special redundancies of image and could be treated as some kind of coarse approximator of DCT. As a result, ME combined with WHT (WHT_ME) could find optimal difference blocks with lower special redundancies, which are more suitable for subsequent DCT coding. According to the study of the present invention, the computation load and the hardware cost of WHT_ME are greatly reduced by utilizing the liner property and energy packing property of WHT. The simulation results also show that the hierarchical subsampling WHT_ME performs better than conventional ME algorithm. Compared with full search (FS), higher image quality could be obtained with lower operation load by about 90% by hierarchical subsampling WHT_ME.

The WHT used in the invention for combination is following. WHT is one kind of orthogonal transform, and packs energy in low frequency coefficients (LFC), which is similar as DCT does. FIG. 4 shows the energy packing of WHT and DCT in s56 samples.

As the simplest orthogonal transform, WHT uses 1 and −1 values to build up basis function, and only addition and subtraction are involved. The definition of, for example, 8*8 WHT has a basis matrix $T=[t_0, t_1, t_2, t_3, t_4, t_5, t_6, t_7]$, the eight bases are following:

$$t_0 = \begin{bmatrix} 1 \\ 1 \\ 1 \\ 1 \\ 1 \\ 1 \\ 1 \\ 1 \end{bmatrix}, t_1 = \begin{bmatrix} 1 \\ 1 \\ 1 \\ 1 \\ -1 \\ -1 \\ -1 \\ -1 \end{bmatrix}, t_2 = \begin{bmatrix} 1 \\ 1 \\ -1 \\ -1 \\ -1 \\ -1 \\ 1 \\ 1 \end{bmatrix}, t_3 = \begin{bmatrix} 1 \\ 1 \\ -1 \\ -1 \\ 1 \\ 1 \\ -1 \\ -1 \end{bmatrix},$$

$$t_4 = \begin{bmatrix} 1 \\ -1 \\ -1 \\ 1 \\ 1 \\ -1 \\ -1 \\ 1 \end{bmatrix}, t_5 = \begin{bmatrix} 1 \\ -1 \\ -1 \\ 1 \\ -1 \\ 1 \\ 1 \\ -1 \end{bmatrix}, t_6 = \begin{bmatrix} 1 \\ -1 \\ 1 \\ -1 \\ -1 \\ 1 \\ -1 \\ 1 \end{bmatrix}, t_7 = \begin{bmatrix} 1 \\ -1 \\ 1 \\ -1 \\ 1 \\ -1 \\ 1 \\ -1 \end{bmatrix}.$$

A transform matrix T is a matrix product of $t_{i,j}=t_i*t'_j$, where ti and tj are selected from bases. The transform matrix T is for the transform coefficient $X_{i,j}$ is $$X_{i,j} = \sum_{\mu=o}^{7} \sum_{v=o}^{7} t_{i,j}(\mu, v) \times x(\mu, v), \; i, j = 0, 1, \ldots 7.$$

For example, the transform matrix of $t_{0,0}$ and $t_{7,7}$ are $$t_{0,0} = \begin{bmatrix} 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \end{bmatrix} \text{ and } t_{7,7} = \begin{bmatrix} 1 & -1 & 1 & -1 & 1 & -1 & 1 & -1 \\ -1 & 1 & -1 & 1 & -1 & 1 & -1 & 1 \\ 1 & -1 & 1 & -1 & 1 & -1 & 1 & -1 \\ -1 & 1 & -1 & 1 & -1 & 1 & -1 & 1 \\ 1 & -1 & 1 & -1 & 1 & -1 & 1 & -1 \\ -1 & 1 & -1 & 1 & -1 & 1 & -1 & 1 \\ 1 & -1 & 1 & -1 & 1 & -1 & 1 & -1 \\ -1 & 1 & -1 & 1 & -1 & 1 & -1 & 1 \end{bmatrix}$$

Figure 4B:
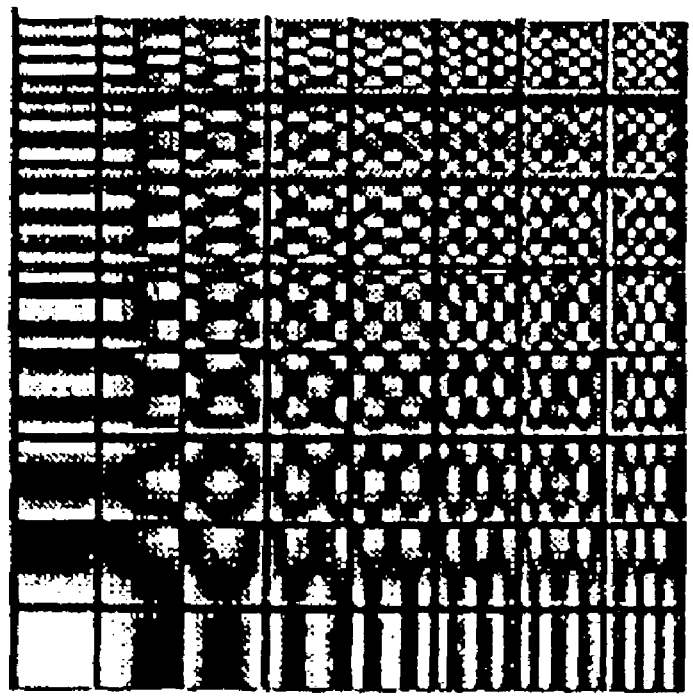
FIGS. 4A-4B are drawings, schematically the effect from WHT and DCT.
Figure 4A:
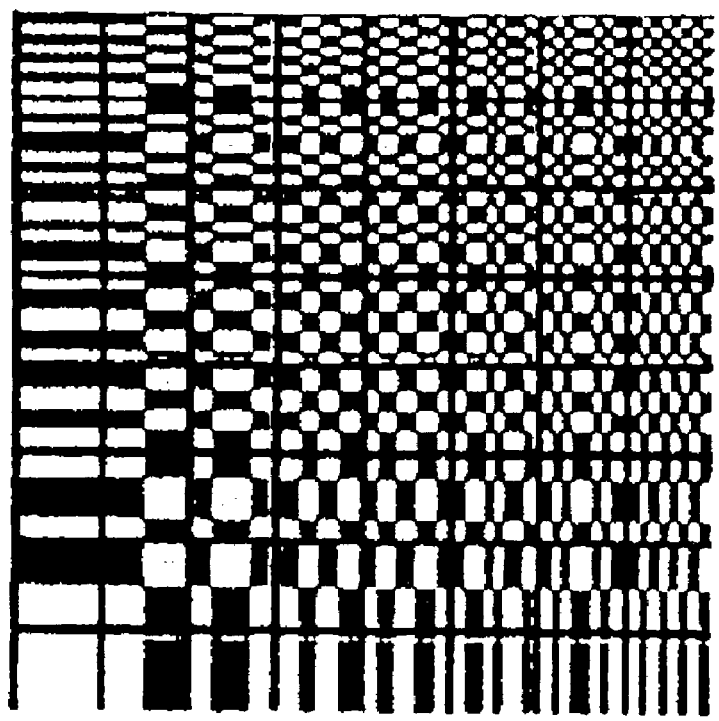

In FIGS. 4A and 4B, the basis images of WHT (FIG. 4A) and DCT (FIG. 4B) are shown. The transform matrices and basis images show that the lower transform coefficients, such as $X_{0,0}$, demonstrate the lower frequency property of the original data and higher transform coefficient, such as $X_{7,7}$ demonstrate the higher frequency property. The transform performances of WHT and DCT are analogous.

The actual calculation of WHT is continuously described here. Although only addition and subtraction are involved, the computation load of WHT is still heavy. For example, in 8*8 WHT, it needs 63 additions or subtractions to get one $X_{i,j}$, and it needs 63*64 operations in total. This is still a large burden for the video process.

Fortunately, it is similar to the fast Fourier transform (FFT), there are great intermediate results, which could be shared in the calculation of WHT. Thus, butterfly structure could be employed to perform WHT. For a simple situation for description, a 4*4 WHT is taken as an example. The definition of 4*4 WHT is:

$$T = [t_0, t_1, t_2, t_3] = \begin{bmatrix} 1 & 1 & 1 & 1 \\ 1 & 1 & -1 & -1 \\ 1 & -1 & -1 & 1 \\ 1 & -1 & 1 & -1 \end{bmatrix}, t_0 = \begin{bmatrix} 1 \\ 1 \\ 1 \\ 1 \end{bmatrix},$$

$$t_1 = \begin{bmatrix} 1 \\ 1 \\ -1 \\ -1 \end{bmatrix}, t_2 = \begin{bmatrix} 1 \\ -1 \\ -1 \\ 1 \end{bmatrix}, \text{ and } t_3 = \begin{bmatrix} 1 \\ -1 \\ 1 \\ -1 \end{bmatrix},$$

$$t_{i,j} = t_i \cdot t'_j, \quad X_{i,j} = \sum_{\mu=0}^{3}\sum_{v=0}^{3} t_{i,j}(\mu, v) \times x(\mu, v), i, j = 0, 1, 2, 3.$$

Figure 5:
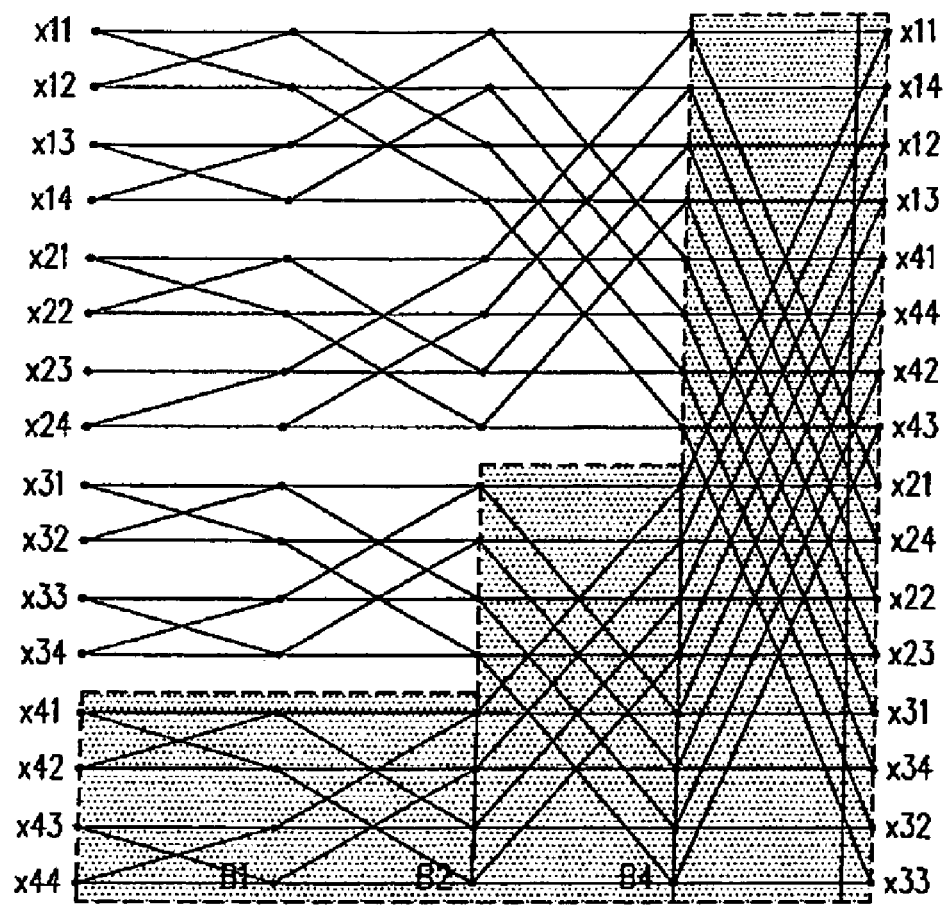
FIG. 5 is a drawing, schematically illustrating a butterfly structure of 4*4 WHT, according to the preferred embodiment of this invention.
Figure 5:
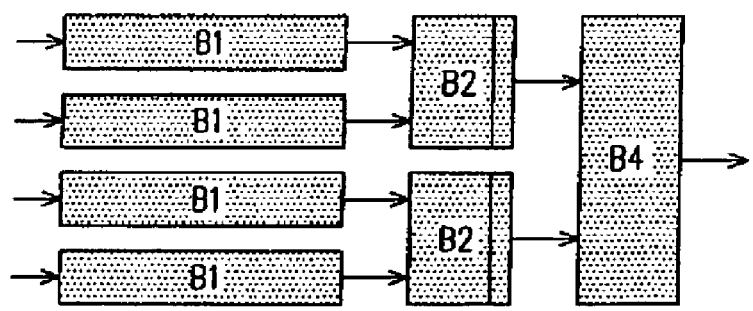

The butterfly structure of 4*4 WHT is shown in FIG. 5. There are several properties of butterfly structure of WHT:

1. Linear property: only additions and subtractions are involved.
2. The butterfly structure of 4*4 WHT could be divided into 3 levels. In level 1, only one line is manipulate in each B1; in level 2, the operators in each B2 relate to two lines; and only in level 3, all of 4 lines are required to calculate WHT coefficients.
3. In level 1, the structures of all B1's are uniform, same does B2 in level 2.

As butterfly structure is employed, the computation load of 4*4 WHT is reduced from 15*16 to 4*16. For 8*8 WHT, it should be reduced from 63*64 to 6*64.

As described in equation (1), the quantity of the conventional sum of absolute difference (SAD) of luminance pixels, serving as the matching criterion, is following $$SAD(i, j) = \sum_{k=0}^{N-1}\sum_{l=0}^{N-1} |E(k, l)| = \sum_{k=0}^{N-1}\sum_{l=0}^{N-1} |C(x+k, y+l) - R(x+i+k, y+j+l)|, \quad (1)$$

where C is the current image, R is the reference image, and E is the difference macro block (MB) of the current MB and reference MB, (x, y) is the location of current MB, (i,j) is the candidate motion vector, i.e., the location of reference MB, and N is the MB size.

In the above formula, the data in both C and R is original luminance pixels. The WHT transformed coefficients of the invention are used instead of the original pixels. Then the WSAD can be computed by following formula:

$$WSAD(i, j) = \sum_{k=0}^{N-1}\sum_{l=0}^{N-1} |W_E(k, l)| = \sum_{k=0}^{N-1}\sum_{l=0}^{N-1} |W_C(k, l) - W_{R(i,j)}(k, l)|, \quad (2)$$

$$W_E(k, l) = WHT(E) = WHT(C - R(i, j)) = W_C - W_{R(i,j)},$$

$$W_C = WHT(C) = \sum_{\mu=0}^{N-1}\sum_{v=0}^{N-1} t_{k,l}(\mu, v) \times C(x+\mu, y+v), \text{ and}$$

$$W_{R(i,j)} = WHT(R(i, j)) = \sum_{\mu=0}^{N-1}\sum_{v=0}^{N-1} t_{k,l}(\mu, v) R(x+i+\mu, y+j+v),$$

where E is a difference macro block (MB) of a current MB and a reference MB, (x, y) is a location of the current MB, (i,j) is a candidate motion vector, N is the MB size can be $2^M$, M=2, 3, 4, ..., and $t_{k,l}=t_k \cdot t'_l$, where $t_{k,l}$ is a matrix product of two basis $t_k$ and $t'_l$=Trans[$t_l$] in WHT transformation. $W_C$, $W_R$ and $W_E$ are the WHT transformed coefficients of current MB, reference MB, and difference MB, WSAD is the SAD of $W_C$ and $W_R$.

For the current common situation for the MPEG 1 or MPEG 2 standard, for example, it has 16*16 MB used in ME, and 8*8 block in DCT. The Above formula (2) of matching criterion then should be modified into formula (3):

$$WSAD(i, j) = WSAD_{1,1}(i, j) + WSAD_{1,2}(i, j) + WSAD_{2,1}(i, j) + WSAD_{2,2}(i, j), \quad (3)$$

$$WSAD_{mn}(i, j) = \sum_{k=0}^{N-1}\sum_{l=0}^{N-1} |W_{Cmn}(k, l) - W_{Rmn(i,j)}(k, l)|, m, n = 1, 2$$

$$W_{C11}(k, l) = \sum_{\mu=0}^{N/2-1}\sum_{v=0}^{N/2-1} t_{k,l}(\mu, v) C(x+\mu, y+v),$$

$$W_{C12}(k, l) = \sum_{\mu=0}^{N/2-1}\sum_{v=N/2}^{N-1} t_{k,l}(\mu, v) C(x+\mu, y+v),$$

$$W_{C21}(k, l) = \sum_{\mu=N/2}^{N-1}\sum_{v=0}^{N/2-1} t_{k,l}(\mu, v) C(x+\mu, y+v), \text{ and}$$

-continued $$W_{C22}(k, l) = \sum_{\mu=N/2}^{N-1} \sum_{v=N/2}^{N-1} t_{k,l}(\mu, v)C(x+\mu, y+v),$$

where N is an integer of $2^M$, M is equal to or greater than 3 and M=4 is for this example, wherein the $W_{C11}(k,l)$, $W_{C12}(k,l)$, $W_{C21}(k,l)$, and $W_{C22}(k,l)$ are transformed coefficients of four (N/2)*(N/2) blocks of current MB, and the formula of $W_{R(i,j)11}$, $W_{R(i,j)12}$, $W_{R(i,j)21}$, and $W_{R(i,j)22}$ are similar to those of $W_{C11}(k,l)$, $W_{C12}(k,l)$, $W_{C21}(k,l)$, and $W_{C22}(k,l)$. The four blocks are used in the WHT_ME algorithm as also shown in FIG. 2.

In the current situation for WHT_ME, the computation load is increased due to the additional operation for WHT. Every candidate reference MB requires four 8*8 WHT's. The computation is still heavy. There are, for example, two ways to reduce the ME computation load, one is only using low frequency coefficients (LFC), and the other one is using overlapped data.

If one uses the LFC, then the details are following. Similarly to DCT, most of energy is concentrated in LFC in WHT. The WSAD greatly depends on the sum of LFC, and it is not necessary to calculate all coefficients in WSAD function.

Figures 6A, 6B, 6C:
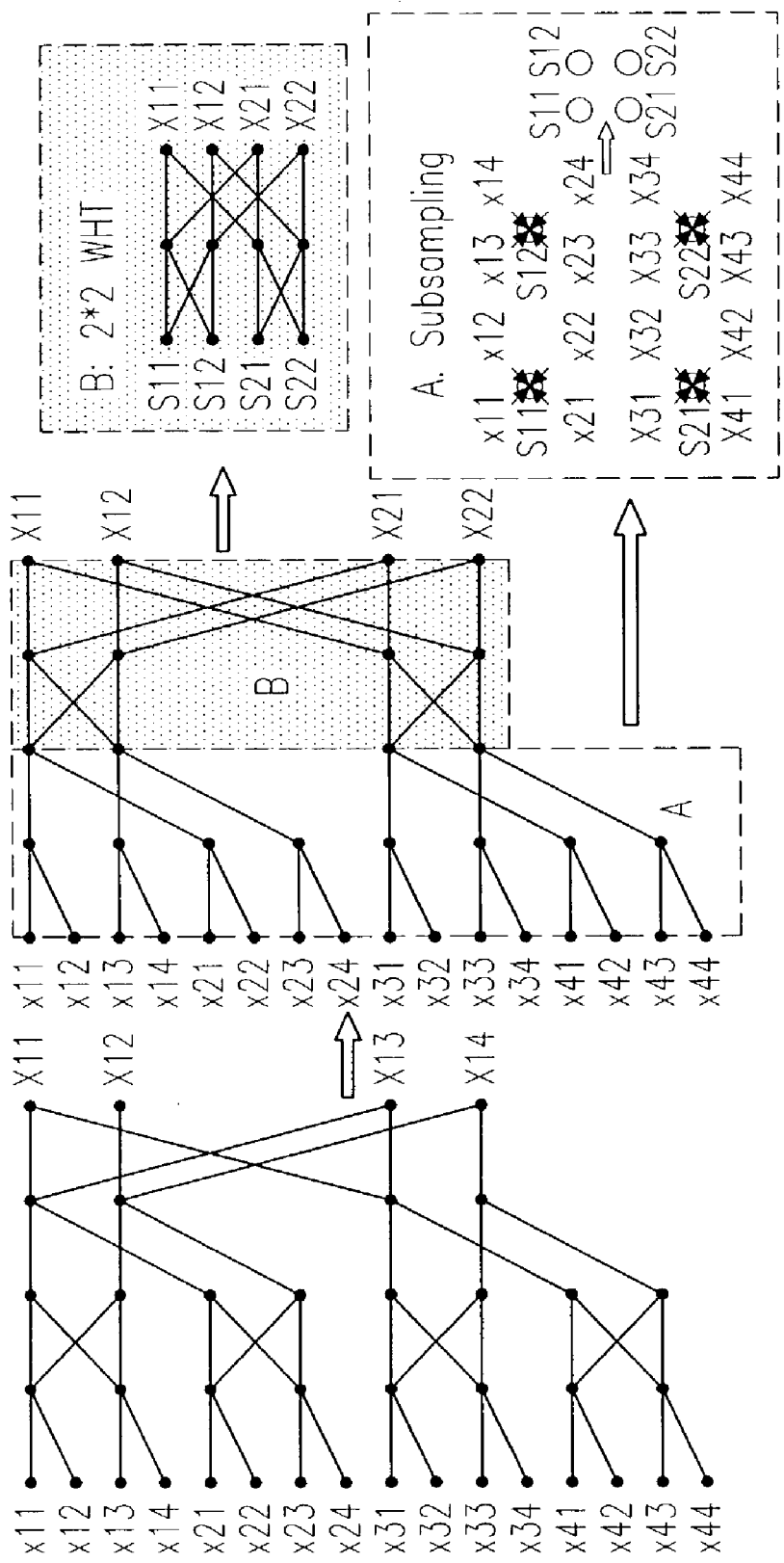
FIGS. 6A-6C are drawings, schematically illustrating a simplified structure in low frequency coefficients from the WHT in FIG. 5.

Analysis shows that if only LFC are calculated, it is equivalent to perform low WHT on subsampled image. To be brief, 4*4 WHT is used as demonstration. If only the 2*2 LFC of 4*4 WHT are desired, the butterfly structure in FIG. 5 should be modified into FIGS. 6A-6C. In FIGS. 6A-6C, the calculation of 2*2 LFC of 4*4 WHT is equivalent to perform 2*2 WHT on 4:1 subsampled imaged. Similarly, calculation of 4*4 LFC or 2*2 LFC of 8*8 WHT is equivalent to perform 4*4 WHT on 4:1 subsampled image or perform 2*2 WHT on 16:1 subsampled image. In FIG. 6A, it is a calculation of 2*2 LFC of 4*4 block. In FIG. 6B, the calculation in FIG. 6A is derived to have a new relation, in which two levels are indicated. In FIG. 6C, a decomposition structure in FIG. 6B is shown. The intermediate levels $S_{11}$, $S_{12}$, $S_{21}$, and, $S_{22}$ are derived from $x_{11}$-$x_{44}$. For example, $S_{11}$ is derived from $x_{11}$, $x_{12}$, $x_{21}$, and $x_{22}$. The $S_{11}$, $S_{12}$, $S_{21}$, and $S_{22}$ is treated as 2*2 WHT. In other words, subsampling is low-pass procedure, which filters high frequency components. WHT_ME is suitable to deal with subsampled image.

Even though the LFC manner has reduced the computation load by a large amount. The computation load can further be reduced by using overlapped data to search window. In FIG. 5, the butterfly procedure can be derived into several levels. Also referring to FIG. 7, each level includes several uniform elements, and each element only involves certain lines of the block. For example, 4*4 WHT is composed of 3 levels. Therefore are four B1 elements in level 1, two B2 elements in level 2, and one B4 in level 3. B1's in level 1 use consecutive lines of the block as the operators, and B1's in adjacent blocks could hare the same lines.

In many ME algorithms, the reference MB's within search window are overlapped. Foe 16*16 MB, a MB shared 15 lines with its upper or lower adjacent MB, so that there great reduplicate operations between adjacent MB's WHT. If the redundancy is omitted, the operation load for WHT can be further greatly reduced.

Figure 7:
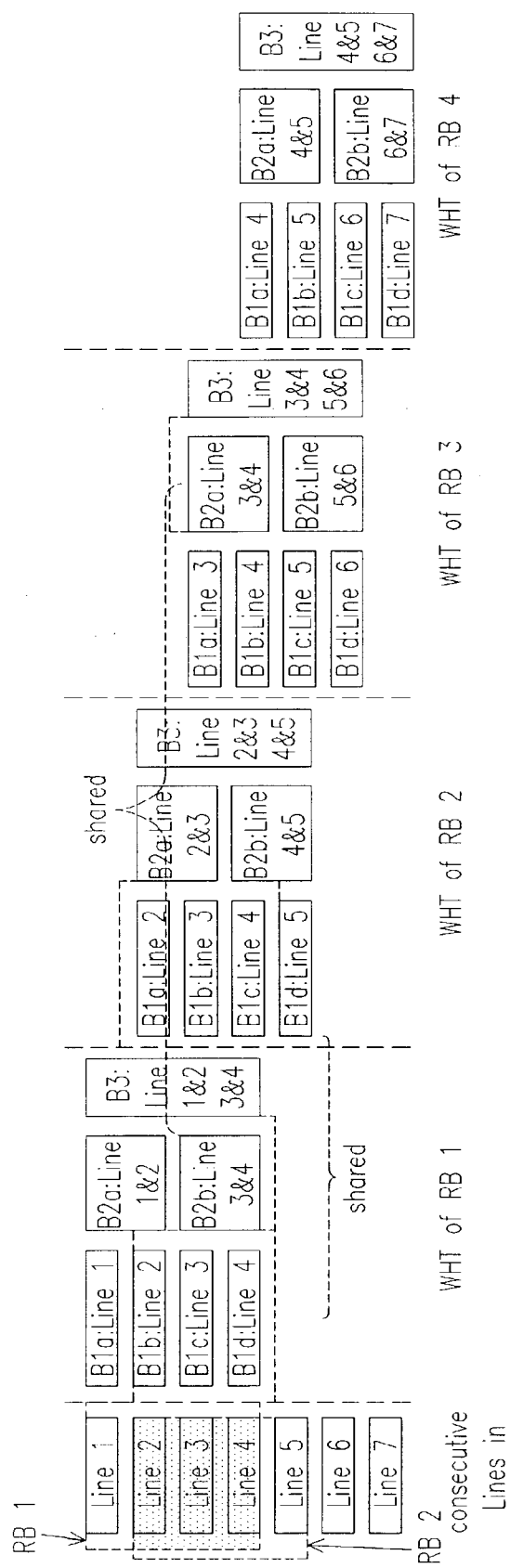
FIG. 7 is a drawing, schematically illustrating the calculation of 4*4 WHT with overlapped data in the adjacent reference blocks.

In FIG. 7, RB is the reference block, and WHT of four adjacent blocks are showed. RB1.B1$a$ denotes element B1$a$ in WHT of RG1, and so on. It shows that both operators and structures of RB2.B1$a$ are the same with those of RB1.B1$b$, i.e., the results of these two elements are the same, so it is not necessary to calculate RB2.B1$a$, same does for RB2.B1$b$ and RB2.B1$c$. Only RB2.B1$d$ should be calculated in level 1 in WHT of RB2.

Figure 8:
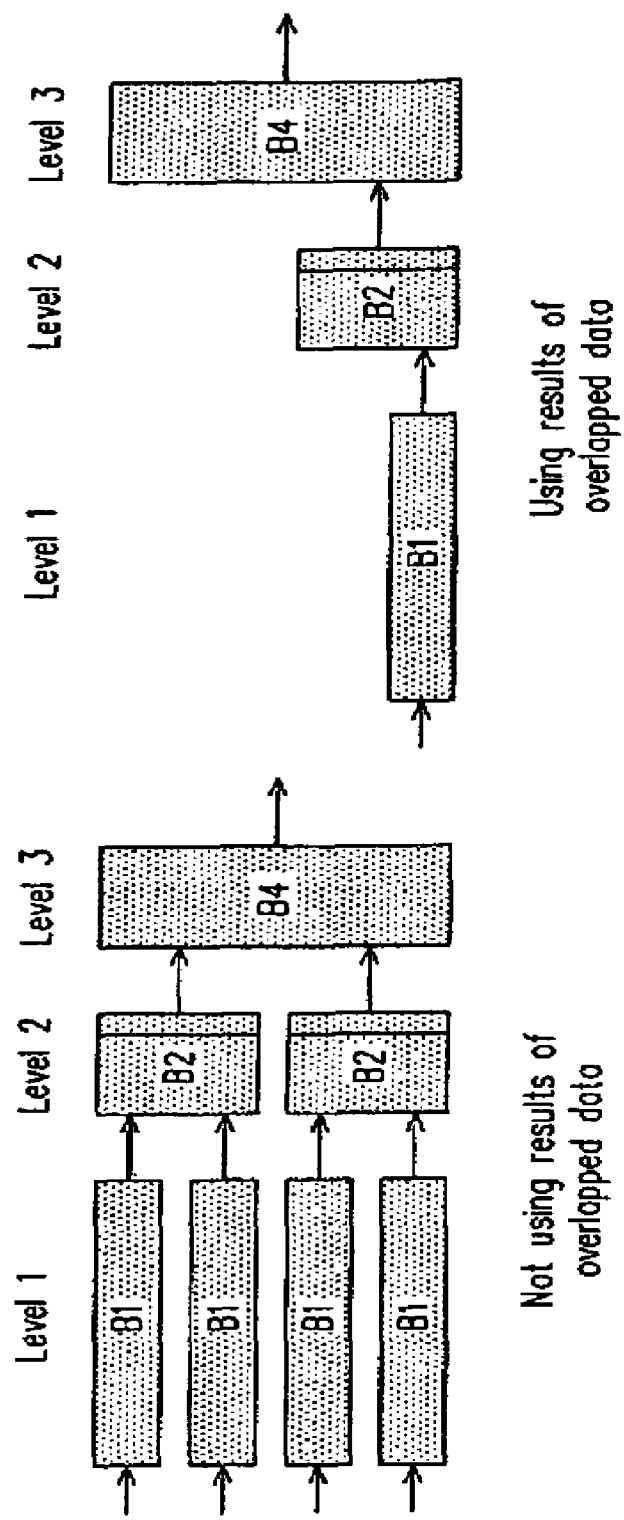
FIG. 8 is a drawing, schematically the butterfly structure using the overlapped data.

In a similar way, in level 1 and level 2 of following blocks, only the lowest element (RBm.B1$d$, M>1; RBn.B2$b$, n>2) should be calculated, and the butterfly structure of 4*4 WHT can be modified as shown in FIG. 8. By using the overlapped data, the computation load of 4*4 WHT can be reduced from 64 to 32.

Figure 9:
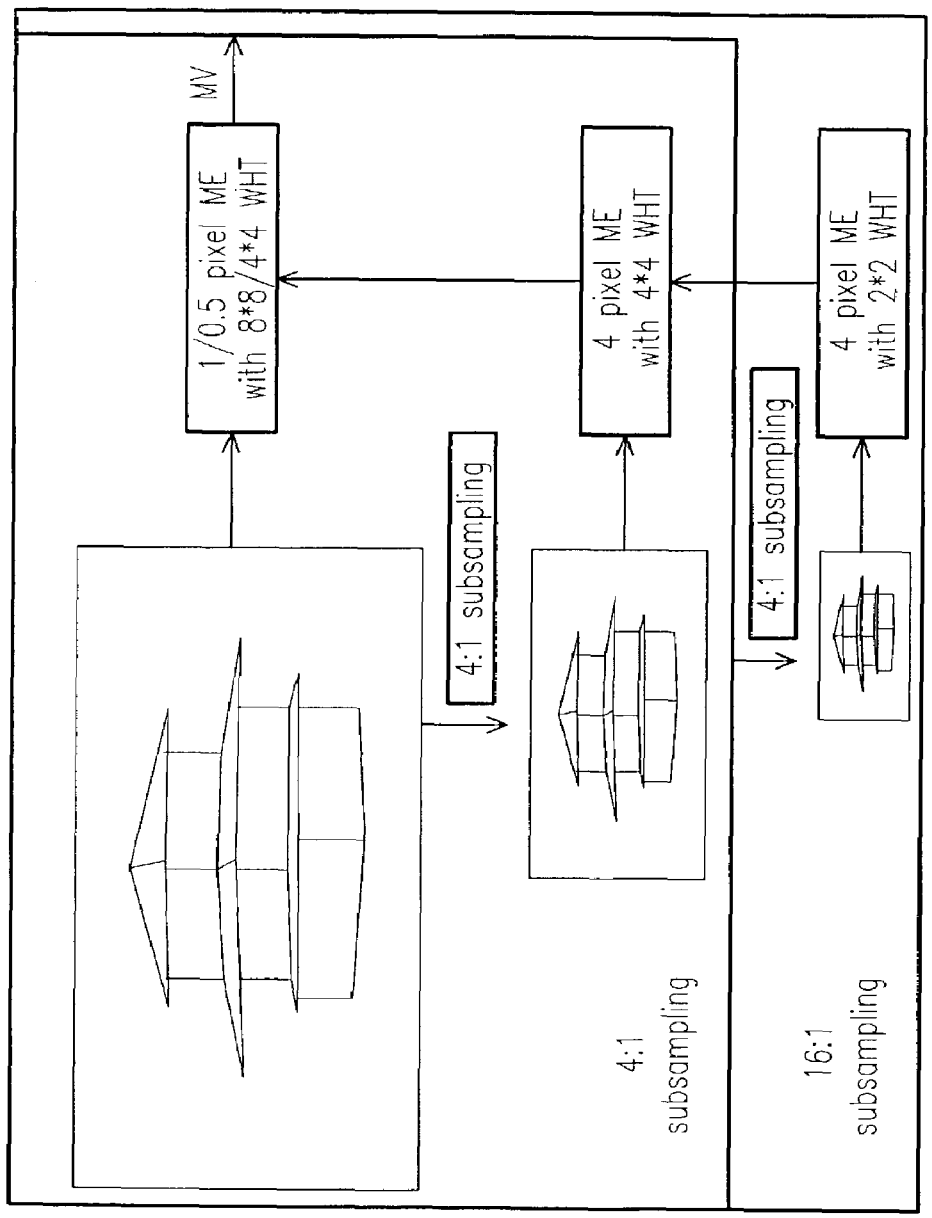
FIG. 9 is a drawing, schematically illustrating an example of hierarchical sub sampling.

According to the WHT_ME algorithm as described above, the WHT_ME algorithm is very suitable for use in processing the low-resolution image associating with a hierarchical subsampled algorithm as shown in FIG. 9. Basing the ratio of subsampling, there are, for example, two kinds of hierarchical algorithms. One is a ratio of 16:1, and another one is a ratio of 4:1. For the ratio of 16:1 subsampling, the hierarchical 16:1 subsampling WHT_ME algorithm includes three steps:

1. A Wide-rage search is performed on 16:1 subsampled image and results in 4-pixels precision MV (coarse MV). 2*2 WHT is combined for 2*2 blocks, computation load and hardware costs are greatly reduced due to the high ratio of subsampling.

2. A small (middle)-range search (9 points) centering on the MV, which is obtained from the first step, is performed on 4:1 subsampled image and results in 2-pixels precision MV. 4*4 WHT is then obtained.

3. A fine (9 points) search centering on the MV, which is obtained from the second step, is performed on full resolution image and results in 0.5-pixels precision MV. 8*8 WHT or 4*4 WHT is combined.

Likewise, for the hierarchical 4:1 subsampling, the WHT_ME algorithm includes two steps:

1. Wild-range search performs on 4:1 subsampled image and results in 2-pixels precision MV. 4*4 WHT is combined.

2. Fine (small-range) search centering on the MV, which is obtained from the first step, performs on full resolution image and results in 0.5-pixels precision MV. 8*8 WHT or 4*4 WHT is combined.

In different steps, different schemes could be employed. Several combined algorithms are shown in Table 1.

TABLE 1

| Algorithm | 4-pixel | 2-pixel | 1-pixel | 0.5-pixel | GOPS |
|---|---|---|---|---|---|
| WHT4:1_A | None | WHT4_WS, 1P | 1WHT8_SS | WHT8_SS | 72 |
| WHT4:1_A | None | WHT4_WS, 4P | 4WHT8_SS | WHT8_SS | 85 |
| WHT4:1_A | WHT2_WS, 4P | 4WHT4_WS, 4P | 4WHT8_SS | WHT8_SS | 29.4 |

TABLE 1-continued

| Algorithm | 4-pixel | 2-pixel | 1-pixel | 0.5-pixel | GOPS |
|---|---|---|---|---|---|
| WHT4:1_A | WHT2_WS, 4P | 4WHT4_WS, 4P | 4WHT4_SS | WHT8_SS | 17.6 |
| WHT4:1_A | WHT2_WS, 4P | 4WHT4_WS, 1P | 1WHT4_SS | WHT8_SS | 13.9 |
| FS | None | None | SAD16_WS | SAD16_SS | 892 |
| FS4:1 | None | SAD8_WS | SAD16_SS | SAD16_SS | 56 |
| FS16:1 | SAD4_WS, 5P | 5SAD8_SS, 5P | 5SAD16_ss | SAD16_SS | 4 |

In table 1, WHT 4:1 and WHT 16:1 mean by the WHT_ME algorithm. FS/FS4:1/FS16:1 mean by the conventional full precision/4:1 subsampling/16:1 subsampling full search ME algorithm. WHT4_WS means wild-range search combined with 4*4 WHT. 1P means only 1 candidate MV is generated, and 4P means four candidate MV are generated. 4WGT4_SS, 4P, 4WHT4_SS mean 4 small-range search should be performed because there are 4 candidate MVs generated in former steps. SAD16_WS means wild-range conventional search, and so on. The last column in Table 1 shows operation load of different algorithms. The ME procedure is based on C-programmed mpeg2 encoder released by MPEG Software Simulation Group (MSSG).

The simulation results show WHT_ME performs better than conventional ME algorithm. Comparing with FS, the computation for WHT4:1 algorithm has been reduced by about 10 times less, and the computation for WHT16:1 algorithm has been reduced by about 50 times less.

In conclusions, the novel WHT_ME algorithm of the present invention is appropriate for searching motion vector in DCT based video compressing system. Using linear property of WHT and overlapped data in search window, the computation load, the hardware cost, bandwidth and power consumption of ME including compute unit and local memory are reduced, depending on the ratio of subsampling. Therefore, this algorithm is useful for real-time wide-range search video encoding applications such as HDTV.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A method for performing a motion estimation combined with a Walsh-Hadamard transform (WHT) algorithm, wherein a pixel array is used to display an image object, the method comprising:

fetching a current image pixel content C and a reference image pixel content R in the pixel array; and performing an transformation using a butterfly architecture on the current image pixel content C and the reference image pixel content R, using a butterflied Walsh-Hadamard transform (WHT) algorithm, wherein the butterfly architecture of the WHT algorithm is divided into a plurality of levels, each level comprises a plurality of elements and each of the elements involves a predetermined number of lines of a current macro block (MB), and only one element of the elements in each level is calculated for the transformation, so that a matching criterion of WHT SAD(i, j), WSAD (i,j), is computed, wherein a formula for computing the WSAD(i,j) is:

$$WSAD(i, j) = \sum_{k=0}^{N-1}\sum_{l=0}^{N-1} |W_E(k, l)| = \sum_{k=0}^{N-1}\sum_{l=0}^{N-1} |W_C(k, l) - W_{R(i,j)}(k, l)|,$$

$$W_E(k,l) = WHT(E) = WHT(C - R(i,j)) = W_C - W_{R(i,j)}$$

$$W_C = WHT(C) = \sum_{\mu=0}^{N-1}\sum_{v=0}^{N-1} t_{k,l}(\mu, v) \times C(x + \mu, y + v), \text{ and}$$

$$W_{R(i,j)} = WHT(R(i, j)) = \sum_{\mu=0}^{N-1}\sum_{v=0}^{N-1} t_{k,l}(\mu, v) R(x + i + \mu, y + j + v),$$

where E is a difference macro block (MB) of the current MB and a reference MB, (x, y) is a location of the current MB, (i,j) is a candidate motion vector, N is the MB size, and $t_{k,l} = t_k \cdot t'_l$, where $t_{k,l}$ is a matrix product of two basis $t_k$ and $t'_l = \text{Trans}[t_l]$ in WHT transformation, wherein the WHT transformation performed on sub-sampled MBs of the current MB and the reference MB with the low-frequency coefficient (LFC) algorithm, which are carried out to obtain low-frequency coefficients.

2. The method of claim 1, wherein the (i,j) of the candidate motion vector includes a location of the reference MB.

3. The method of claim 1, wherein N is equal to 8, and the bases $t_k$ and $t_l$ are selected from eight bases of:

$$t_0 = \begin{bmatrix}1\\1\\1\\1\\1\\1\\1\\1\end{bmatrix}, t_1 = \begin{bmatrix}1\\1\\1\\1\\-1\\-1\\-1\\-1\end{bmatrix}, t_2 = \begin{bmatrix}1\\1\\-1\\-1\\-1\\-1\\1\\1\end{bmatrix}, t_3 = \begin{bmatrix}1\\1\\-1\\-1\\1\\1\\-1\\-1\end{bmatrix},$$

$$t_4 = \begin{bmatrix}1\\-1\\-1\\1\\1\\-1\\-1\\1\end{bmatrix}, t_5 = \begin{bmatrix}1\\-1\\-1\\1\\-1\\1\\1\\-1\end{bmatrix}, t_6 = \begin{bmatrix}1\\-1\\1\\-1\\-1\\1\\-1\\1\end{bmatrix}, t_7 = \begin{bmatrix}1\\-1\\1\\-1\\1\\-1\\1\\-1\end{bmatrix}.$$

4. The method of claim 1, wherein N is equal to 4, and the bases $t_k$ and $t_l$ are selected from four bases of:

$$t_0 = \begin{bmatrix} 1 \\ 1 \\ 1 \\ 1 \end{bmatrix}, t_1 = \begin{bmatrix} 1 \\ 1 \\ -1 \\ -1 \end{bmatrix}, t_2 = \begin{bmatrix} 1 \\ -1 \\ -1 \\ 1 \end{bmatrix}, \text{ and } t_3 = \begin{bmatrix} 1 \\ -1 \\ 1 \\ -1 \end{bmatrix}.$$

5. The method of claim 1, wherein the low-frequency coefficient (LEG) algorithm is included to reduce the computation load, a pixel sub-sampling is performed first, and then WHT on the sub-sampled macro blocks are carried out to obtain the low-frequency coefficients.

6. The method of claim 1, wherein the overlapped data algorithm is included to reduce the computation load, a process of overlapped data in calculation of the reference macro blocks is also included in the butterfly structure where the part of the intermediate data in each level is shared with the following level so that only part of new coming data need to be calculated.

7. A method for performing a motion estimation combined with a Walsh-Hadamard transform (WHT) algorithm, wherein a pixel array is used to display an image object, a size of N*N macro block (MB) is used for the motion estimation, and four (N/2)*(N/2) blocks are used in a discrete cosine transform (DCT) computation the method comprising:

fetching a current image pixel content C and a reference image pixel content R in the pixel array; and performing an transformation using a butterfly architecture on the current image pixel content C and the reference image pixel content R, using a butterflied Walsh-Hadamard transform algorithm, wherein the butterfly architecture of the WHT algorithm is divided into a plurality of levels, each level comprises a plurality of elements and each of the elements involves a predetermined number of lines of the MB, and only one element of the element in each level is calculated for the transformation, so that a matching criterion of WSAD(i,J) is computed by a formula:

$$WSAD(i, j) = WSAD_{1,1}(i, j) + WSAD_{1,2}(i, j) + WSAD_{2,1}(i, j) + WSAD_{2,2}(i, j),$$

$$WSAD_{mn}(i, j) = \sum_{k=0}^{N-1}\sum_{l=0}^{N-1} |W_{Cmn}(k, l) - W_{Rmn(i,j)}(k, l)|, m, n = 1, 2$$

$$W_{C11}(k, l) = \sum_{\mu=0}^{N/2-1}\sum_{\nu=0}^{N/2-1} t_{k,l}(\mu, \nu)C(x+\mu, y+\nu),$$

$$W_{C12}(k, l) = \sum_{\mu=0}^{N/2-1}\sum_{\nu=N/2}^{N-1} t_{k,l}(\mu, \nu)C(x+\mu, y+\nu),$$

$$W_{C21}(k, l) = \sum_{\mu=N/2}^{N-1}\sum_{\nu=0}^{N/2-1} t_{k,l}(\mu, \nu)C(x+\mu, y+\nu), \text{ and}$$

$$W_{C22}(k, l) = \sum_{\mu=N/2}^{N-1}\sum_{\nu=N/2}^{N-1} t_{k,l}(\mu, \nu)C(x+\mu, y+\nu),$$

where N is an integer of $2^M$ M is equal to or greater than 3, wherein the $W_{c11}(k,l)$, $W_{c12}(k,l)$, $W_{c21}(k,l)$, and $W_{c22}(k,l)$ are transformed coefficients of four (N/2)*(N2) blocks of current MB, and the formula of $W_{R(i,j)11}$, $W_{R(i,j)12}$, $W_{21}$, and $W_{R(i,j)22}$ are similar to those of $W_{c11}(k,l)$, $W_{c12}(k,l)$, $W_{c21}$ (k,l), and $W_{c22}(k,l)$, wherein $t_{k,l} = t_k \cdot t'_l$, $t_{k,l}$ is a matrix product of two basis $t_k$ and $t'_l = \text{Trans}[t_l]$ in WHT transformation, wherein the WHT transformation performed on sub-sampled MBs of the current MB with the low-frequency coefficient (LFC) algorithm, which are carried out to obtain low-frequency coefficients.

8. The method of claim 7, wherein the (i,j) of the candidate motion vector includes a location of the reference MB.

9. The method of claim 7, wherein N is equal to 16, and the bases $t_k$ and $t_l$ are selected from eight bases of:

$$t_0 = \begin{bmatrix} 1 \\ 1 \\ 1 \\ 1 \\ 1 \\ 1 \\ 1 \\ 1 \end{bmatrix}, t_1 = \begin{bmatrix} 1 \\ 1 \\ 1 \\ 1 \\ -1 \\ -1 \\ -1 \\ -1 \end{bmatrix}, t_2 = \begin{bmatrix} 1 \\ 1 \\ -1 \\ -1 \\ -1 \\ -1 \\ 1 \\ 1 \end{bmatrix}, t_3 = \begin{bmatrix} 1 \\ 1 \\ -1 \\ -1 \\ 1 \\ 1 \\ -1 \\ -1 \end{bmatrix}, t_4 = \begin{bmatrix} 1 \\ -1 \\ -1 \\ 1 \\ 1 \\ -1 \\ -1 \\ 1 \end{bmatrix},$$

$$t_5 = \begin{bmatrix} 1 \\ -1 \\ -1 \\ 1 \\ -1 \\ 1 \\ 1 \\ -1 \end{bmatrix}, t_6 = \begin{bmatrix} 1 \\ -1 \\ 1 \\ -1 \\ -1 \\ 1 \\ -1 \\ 1 \end{bmatrix}, t_7 = \begin{bmatrix} 1 \\ -1 \\ 1 \\ -1 \\ 1 \\ -1 \\ 1 \\ -1 \end{bmatrix}.$$

10. The method of claim 7, wherein the low-frequency coefficient (LFC) algorithm is included to reduce the computation load, a pixel sub-sampling is performed first, and then WHT on the sub-sampled macro blocks are carried out to obtain the low-frequency coefficients.

11. The method of claim 7, wherein the overlapped data algorithm is included to reduce the computation load, a process of overlapped data in calculation of the reference macro blocks is also included in the butterfly structure where the part of the intermediate data in each level is shared with the following level so that only part of new coming data need to be calculated.

12. A hierarchical subsampling method, used to process a low-resolution image, which has a size of N*N pixels, where N is an integer $2^M$, M=2, 3, . . . , the method comprising:

setting up a $WHT_{13}$ ME processing algorithm using a butterfly architecture, which is a combination of a motion estimation algorithm with a butterflied Walsh-Hadamard transform (WHT) algorithm, wherein the butterfly architecture of the WHT_ME Processing algorithm is divided into a plurality of levels, each level comprises a plurality of elements and each of the elements involves a predetermined number of lines of a current macro block (MB), and only one element of the elements in each level is calculated for the WHT_ME processing algorithm;

performing a fine-range search on the image to have a first level image by a first subsampling precision on a motion vector (MV), using the WHT_ME processing algorithm;

optionally performing a middle-range search centering on the MV from the first level image by 9 points, to have a second level image with a second level subsampling precision, using the WHT_ME processing algorithm; and performing a fine-range search centering on the MV from the second level image by 9 points, to have a full resolution image with a 0.5-pixels precision level, using the WHT_ME processing algorithm.

13. The method of claim 12, wherein for a hierarchical 16:1 process, a set of operation conditions includes:

the first level image having a precision of 4-pixels, and the second level image having a precision of 2-pixels.

* * * * *